July 3, 1928.

E. H. SMITH

TORCH TIP

Filed Feb. 11, 1927

1,675,668

INVENTOR
ELMER H. SMITH
By Paul, Paul & Moore
ATTORNEYS

Patented July 3, 1928.

1,675,668

UNITED STATES PATENT OFFICE.

ELMER H. SMITH, OF MINNEAPOLIS, MINNESOTA.

TORCH TIP.

Application filed February 11, 1927. Serial No. 167,527.

This invention relates to new and useful improvements in torch tips, generally, and more particularly relates to such tips of the class used for welding and cutting metal, which usually are subjected to a very intense heat at the discharge end or tip thereof, which often times causes pre-ignition or back-firing of the fuel mixture therein when the torch is in use. Such pre-ignition of the fuel mixture in the torch tip is objectionable to the operation thereof, and it is an object of this invention to embody in the construction of the torch tip, means adapted to prevent such pre-ignition or back-firing of the fuel mixture or gases when the torch is in use.

A further object of the invention is to provide a torch tip having a suitable heat-resisting material embodied in the construction thereof adjacent the discharge end thereof adapted to insulate the fuel duct in the tip against excessive heat, thereby preventing pre-ignition of the gases therein when the torch tip is in use.

A further and more specific object of the invention is to provide a torch tip comprising an elongated integral body having an axial bore therein, in which a relatively smaller tube is mounted, having one end received in a socket provided at the bottom of the bore and communicating with the usual fuel duct or passage provided in the torch tip body, and the other end of the tube having means for securing it to the end of the tip, thereby providing an annular chamber around the tube which is filled with a suitable insulating material adapted to insulate the fuel passage in the tube against excessive heat, when the torch tip is in use, thereby preventing pre-ignition of the fuel mixture or gases in the torch tip. The wall of the torch tip body around the bore 14 is of sufficient thickness to act as a conductor to conduct heat rearwardly away from the tip of the nozzle towards the receiving end thereof.

Other objects of the invention will appear from the following description and accompanying drawings and will be pointed out in the annexed claims.

In the drawings there has been disclosed a structure designed to carry out the various objects of the invention, but it is to be understood that the invention is not confined to the exact features shown as various changes may be made within the scope of the claims which follow.

In the accompanying drawings forming part of this specification;

Figures 1, 2:
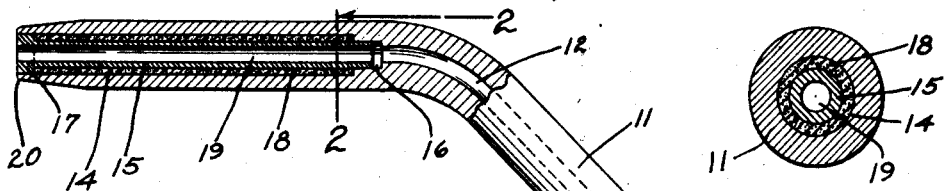
Figure 1 is a view showing a torch tip with its discharge end partially broken away to show the interior construction thereof.
Figure 2 is an enlarged cross-sectional view on the line 2—2 of Figure 1, showing the tube axially mounted therein and surrounded by an insulating material.

In the selected embodiment of the invention here shown, there is illustrated for purposes of disclosure, a torch tip of ordinary construction, comprising an elongated integral body portion 11 having a fuel duct or passage 12 therein. The receiving end of the body 11 is provided with the usual clamping nut 13 whereby it may be detachably secured to its fuel supply and supporting means, not shown in the drawing.

The torch tip shown in the drawing and above described, is of the type usually employed for welding and cutting metal and other materials. The discharge end of such a torch tip is usually subjected to a very intense heat, when in use, which often times causes pre-ignition or back-firing of the fuel-mixture in the torch tip adjacent the discharge end thereof, caused by the torch tip body becoming heated to a degree where it ignites the fuel-mixture passing therethrough. Such pre-ignition of the fuel mixture in the torch tip is detrimental to the operation of the torch tip, when welding or cutting metal, and usually when it occurs, the torch must be laid aside to allow the heated tip to cool sufficiently to prevent such pre-ignition before it is again used. It is, therefore, desirable that means be provided for preventing such pre-ignition of the fuel-mixture in the torch tip, when the latter is in use.

The means shown and described in this invention for thus preventing such pre-ignition of the fuel mixture in the torch tip, consists in embodying in the construction of the tip, a suitable insulating or heat-resisting material which functions to insulate the fuel duct therein against the excessive heat to which the torch tip is subjected when in use, and, which insulating material sufficiently insulates the fuel duct to prevent the fuel mixture from igniting therein.

The preferred form of the invention is shown in Figure 1, and consists in providing a bore 14 in the body 11 of the tip in which a tube 15 is mounted, the diameter of which is smaller than the bore 14 so as to provide an annular chamber or space around the tube. The inner end of the tube is slidably received in a socket 16 provided at the bottom of the bore 14. The outer end of the tube 15 preferably has a head 17 thereon fitting the bore 14 so as to provide a closure for the annular chamber surrounding the tube 15.

The annular chamber around the tube 15 is filled with a suitable insulating material 18 such, for instance, as calcium oxide, which is impervious to heat and therefor provides an insulating medium for the interior or passage 19 in the tube 15 which, it will be noted by reference to Figure 1, communicates with the fuel duct 12 in the torch tip body 11. The insulating material 18 is preferably mounted upon and suitably secured to the exterior of the tube 15 before the latter is inserted into the bore 14. After the tube 15, with the insulating material 18 mounted thereon, is inserted into the bore 14, the terminal of the torch tip is rolled or swedged over at 20 to fixedly secure the head 17 of the tube to the body 11.

It has been found in actual practice, that by thus insulating the fuel passage in the torch tip adjacent the discharge end thereof, that the torch tip may be continually used for a considerable length of time without danger of the fuel mixture pre-igniting therein. The embodiment of the insulating material in the construction of the torch tip, therefore, has proven to be a valuable feature, as the operation of cutting or welding the work is greatly expedited, resulting from the fact that the torch tip may be continually used for a considerable period of time without interruption. As a result of the nozzle body being constructed of one piece and having its wall portion, surrounding the bore 14, comparatively large in cross sectional area, heat will be conducted away from the nozzle tip through the nozzle body towards the receiving end thereof, thereby tending to lower the temperature of the nozzle adjacent to its discharge end. The slip-connection between the inner end of the tube 15 and the socket 16 is also important in that it permits longitudinal expansion and contraction of the tube within the bore, without danger of its outer end becoming loosened or disengaged from the nozzle body.

Figure 3:
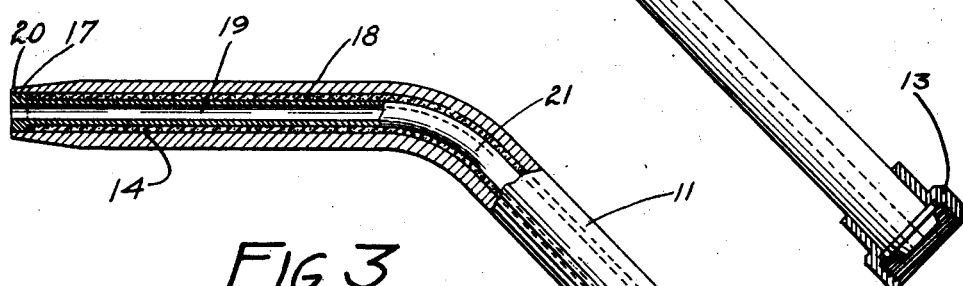
Figure 3 is a modified form wherein the tube and insulating material extend the full length of the torch tip body.

Figure 3 illustrates a modified form wherein a tube 21 is mounted in the torch tip and extends substantially the entire length of the torch tip body. In like manner, the insulating material 18 extends the full length of the body 11.

Figure 4:
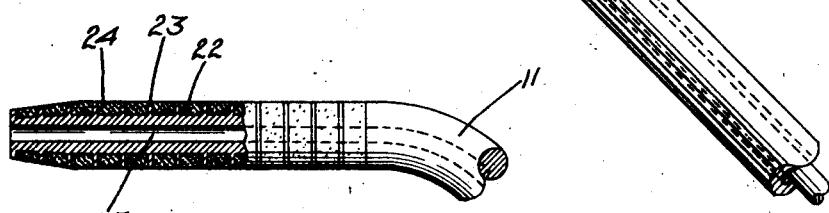
Figure 4 is another modified form wherein the tube is dispensed with, and in place thereof, the body of the torch tip is provided with a plurality of annular grooves which are filled with a suitable insulating material which functions to insulate the fuel duct against excessive heat.

Figure 4 illustrates another modified form wherein the body 11 of the torch tip has a plurality of annular grooves 22 provided therein which are spaced apart by annular ribs 23 as shown. Each groove 22 is filled with a suitable insulating material 24, thereby insulating the fuel passage 25 in the torch tip against excessive heat, in a manner similar to that shown and described with reference to the previous figures.

Figure 5:
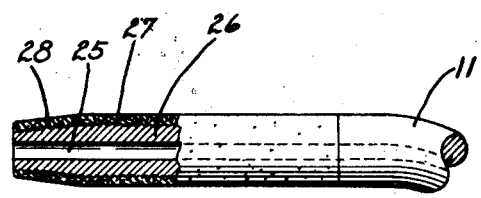
Figure 5 is another modification wherein the torch tip body has been reduced in size and knurled or roughened to provide an anchor for the insulating material exteriorly mounted upon and encircling the end portion of the torch tip.

Figure 5 illustrates another modification wherein the body 11 of the torch tip is provided with a reduced end portion 26 having its outer surface knurled or roughened, as indicated at 27, to provide a suitable anchor for the insulating material 28 secured thereto.

Figure 6:
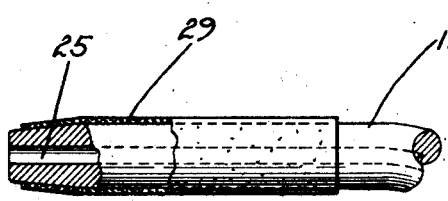
Figure 6 is another modification showing an insulating sleeve exteriorly mounted upon the torch tip body adjacent the discharge end thereof.

Figure 6 also illustrates a modification wherein an insulating sleeve or member is fitted over the discharge end of the torch tip body 11 as shown. This insulating sleeve 29 may be detachably secured to the torch tip so that it may be replaced if necessary.

I claim as my invention:

1. A torch tip comprising an elongated body having a fuel duct therein, said body being constructed of a single piece of heat-conducting metal whereby heat, generated at the discharge end of the body, will be conducted rearwardly away from said end without resistance, said body having an axial bore therein, a socket at the bottom of said bore communicating with said fuel duct, an elongated tube mounted in said bore and having one end movably received in said socket, the exterior diameter of said tube being relatively smaller than the diameter of said bore to provide an annular chamber around said tube, means for securing the opposite end of the tube to the tip body adjacent the discharge end thereof, and an insulating material in said annular chamber adapted to insulate the fuel passage through said tube against excessive heat to prevent pre-ignition of the fuel mixture therein.

2. A torch-tip comprising a body portion having a fuel passage said passage being provided at its discharge end with a heat insulating covering externally of the fuel passage to protect the passage against heat that would cause pre-ignition of fuel in the passage, the body portion of the tip from its discharge end to its receiving end being in one continuous jointless piece to serve to conduct heat through the body portion from the discharge end of the tip rearwardly in the direction of the receiving end of the tip body to dissipate the heat generated at the discharge end and minimize the liability of pre-ignition in the fuel passage at the discharge end.

In witness whereof, I have hereunto set my hand this 8th day of February, 1927.

ELMER H. SMITH.